United States Patent [19]

Sabacky et al.

[11] Patent Number: 4,462,822

[45] Date of Patent: Jul. 31, 1984

[54] MOLYBDENUM DIOXIDE-MOLYBDENITE ROASTING

[75] Inventors: Bruce J. Sabacky, Westminster; Malcolm T. Hepworth, Golden, both of Colo.

[73] Assignee: Amax Inc., Greenwich, Conn.

[21] Appl. No.: 549,845

[22] Filed: Nov. 8, 1983

[51] Int. Cl.$^3$ .............................................. C22B 1/02
[52] U.S. Cl. .................................... 75/7; 423/53; 423/606
[58] Field of Search ............... 423/53, 57, 606, 607; 75/7-9

[56] References Cited

U.S. PATENT DOCUMENTS 3,336,100  8/1967  Cloppet ............................... 423/606
3,941,867  3/1976  Wilkomirsky et al. ............. 423/606

Primary Examiner—Michael L. Lewis
Attorney, Agent, or Firm—Michael A. Ciomek; Eugene J. Kalil

[57] ABSTRACT

A process is disclosed for roasting molybdenite concentrates directly to molybdenum dioxide. The process comprises establishing a roasting zone having a temperature of about 700° C. to about 800° C., introducing into the roasting zone particulate molybdenum dioxide and molybdenite in a weight ratio of at least about 2:1 along with an oxygen-containing gas in amount sufficient to oxidize the sulfur content of the molybdenite to molybdenum dioxide.

9 Claims, No Drawings

MOLYBDENUM DIOXIDE-MOLYBDENITE ROASTING

The present invention provides a process wherein molybdenite (MoS$_2$) concentrates are roasted directly to molybdenum dioxide.

BACKGROUND OF THE INVENTION AND THE PRIOR ART

It has been recognized heretofor that molybdenum dioxide (MoO$_2$) is a superior product to molybdenum trioxide (MoO$_3$) in a number of ways. For instance, the molybdenum content of MoO$_2$ (75%) is higher than that of MoO$_3$ (66%). In addition, the specific gravity of MoO$_2$ (6.44) is considerably higher than that of MoO$_3$ (4.5). These factors favor MoO$_2$ when packaging and shipping costs are considered. In addition, MoO$_2$ is much less volatile than MoO$_3$ when heated and this factor favors use of MoO$_2$ as an alloying addition agent.

Conventional methods of roasting molybdenite produce molybdenum trioxide. Accordingly, the prior art sought to partially reduce MoO$_3$ to MoO$_2$ with reducing agents such as hydrogen using elevated temperatures. This partial reduction procedure involved a two-step method which resulted in increased costs and resort to an expensive agent, hydrogen, which is difficult to handle. Resort was also had to another two-step and tricky process involving the endothermic reaction of molybdenite (MoS$_2$) with MoO$_3$. This reaction requires at least six (6) gram-molecular weights of MoO$_3$ to one of MoS$_2$. Careful control of the trioxide to sulfide ratio is required to avoid incomplete roasting at too low a ratio and to avoid the formation of a low-melting sticky phase in the product at too high a ratio of MoO$_3$-to-MoS$_2$. The presence in the concentrate of oil from the flotation process complicates control of the ratio. Such oil is frequently variable in amount and consumes oxygen at the roasting temperature which is usually about 700° C.±50° C. A process which could provide molybdenum dioxide directly from molybdenite in a single step would afford significant advantage as compared to the prior processes, particularly if the process were controllable. Such a controllable, single-step process is provided by the invention.

SUMMARY OF THE INVENTION

Molybdenite concentrate to be roasted is introduced into a roasting zone along with molybdenum dioxide in a dioxide-to-molybdenite weight ratio of at least about 2:1 and is roasted with an oxygen-containing gas at a temperature between about 700° and about 800° C. Conveniently, the molybdenum dioxide feed can be recycled product from the roaster cooled to a temperature below about 400° C. The product is free-flowing with a low MoO$_3$ content and the process is controllable by adjusting the dioxide-to-molybdenite feed ratio. A strong SO$_2$ gas suitable for acid production is produced.

DETAILED DESCRIPTION OF THE INVENTION

Molybdenite concentrates are roasted in a single operation to produce a free-flowing molybdenum dioxide (MoO$_2$) of low sulfur content and low molybdenum trioxide (MoO$_3$) content. This result is accomplished by feeding to the hot zone of a suitable reactor, e.g., a rotary kiln, molybdenite concentrates and molybdenum dioxide in a dioxide-to-molybdenite weight ratio of at least about 2:1. Air or other oxygen-containing gas in controlled amounts is also introduced. Most conveniently, the molybdenum dioxide fed to the reactor hot zone is recycled product of the reactor having a temperature below about 400° C.

The reactor hot zone is maintained at a temperature between about 700° and about 800° C. Temperature control is afforded by controlling the amount of cool molybdenum dioxide recycled to the reactor with molybdenite feed. The roasting reaction for conversion of molybdenite (which may contain flotation oils) is exothermic. The reaction will usually go to completion within approximately 20 to 50 minutes by control of the quantity of introduced air, and by control of the residence time of the reacting mixture in the hot zone of the reactor.

It will be appreciated that the molybdenite to be roasted, being a flotation product, will have a relatively fine particle size, e.g., minus 30 mesh. The recycled MoO$_2$ will likewise be quite fine in particle size, e.g., below about 30 mesh.

Advantageously, the MoO$_2$ recycle is mixed or blended with the molybdenite feed prior to being introduced into the reactor, but this is not essential.

If the heat generated by the oxidation of oil (from flotation) and the oxidation of MoS$_2$ causes the hot zone temperature to rise above the limit where the product begins to agglomerate (circa 800° C.) the rate of cold MoO$_2$ recycle is increased. The ratio of recycled MoO$_2$ to molybdenite may vary over a wide range, e.g., 2:1 to 6:1 or higher. Advantageously, a heat exchanger can be used to cool the MoO$_2$ recycle.

Sulfur content of the MoO$_2$ product will usually be below 0.1% and the MoO$_3$ content of the product will generally be less than approximately 10%.

The strength of SO$_2$ produced in roasting according to the invention can be as high as 15% if stoichiometric air is used and dried, de-oiled concentrate is being roasted. The presence of oil or moisture in the concentrate will decrease the SO$_2$ strength. The SO$_2$ gas concentration will in no event be as low as that which results from multiple-hearth roasting. High SO$_2$ content is a clear advantage since strong SO$_2$ gas can be economically converted to sulfuric acid, thereby solving a potential environmental problem and lowering acid production costs. An example will now be given:

Molybdenite concentrate having an average grade of 52% Mo and 36% S and molybdenum dioxide produced therefrom were blended in the ratio of 1:4 and fed to a 6-inch diameter externally fired rotary kiln which was inclined to the horizontal at a slope of 1/16 inch per linear foot and was rotated at 4 r.p.m. The hot zone was maintained at a temperature of 750° C. After 45 minutes residence time in the hot zone a product assaying 0.10 percent sulfur and 64.4 percent Mo was produced. The MoO$_3$ content of the product was 10.3%. The rate of feed of solids and air during the run were, respectively, 100 grams per minute and 62.8 grams per minute. An off-gas containing 10.9% SO$_2$ and only 1% entrained solids was produced. It will be appreciated that external firing was only required in this example because the heat losses due to the small size of the kiln were excessive. Commercial size equipment would require no supplemental fuel.

It is believed that the principal roasting reaction involved in the present invention is as follows:

$$MoS_2 + 3O_2 \rightarrow 2SO_2 + MoO_2$$

The presence of a large quantity of recycle $MoO_2$ along with concentrate during roasting is believed to control the rate of molybdenite oxidation via the following two reactions:

$$MoO_2 + \tfrac{1}{2}O_2 \rightarrow MoO_3$$

and $$6MoO_3 + MoS_2 \rightarrow 7MoO_2 + 2SO_2$$

This affords a measure of control for both the temperature of reaction and especially the oxygen chemical potential.

Although the present invention has been described in conjunction with preferred embodiments, it is to be understood that modifications and variations may be resorted to without departing from the spirit and scope of the invention, as those skilled in the art will readily understand. Such modifications and variations are considered to be within the purview and scope of the invention and appended claims.

We claim:

1. The process for roasting molybdenite concentrates directly to molybdenum dioxide which comprises establishing a roasting zone having a temperature of about 700° C. to about 800° C., introducing into said roasting zone particulate molybdenum dioxide and molybdenite in a weight ratio of at least about 2:1 along with an oxygen-containing gas in amount sufficient to oxidize the sulfur content of said molybdenite and oxidizing said molybdenite to molybdenum dioxide within said roasting zone.

2. The process in accordance with claim 1 wherein the temperature of said molybdenum dioxide fed to said roasting zone does not exceed about 400° C.

3. The process in accordance with claim 1 wherein said oxidizing gas is air.

4. The process in accordance with claim 1 wherein said molybdenum dioxide fed to said roasting zone is recycled product.

5. The process in accordance with claim 1 wherein the ratio of molybdenum dioxide to molybdenite fed to said roasting zone is increased with temperature rise within said zone.

6. The process in accordance with claim 1 wherein molybdenite fed to said roasting zone is mixed with molybdenum dioxide.

7. The process in accordance with claim 1 wherein the material within said roasting zone comprises principally molybdenum dioxide.

8. The process in accordance with claim 1 wherein molybdenum dioxide is removed from said roasting zone at substantially the same rate, on a molybdenum weight basis, as the material introduced into said zone and that the molybdenum dioxide product is removed from the process at substantially the same rate, on a molybdenum weight basis, as molybdenite is introduced into the process.

9. The process in accordance with claim 1 wherein said roasting zone is established in a rotary kiln.

* * * * *